United States Patent [19]

Lee et al.

[11] Patent Number: 4,910,025

[45] Date of Patent: Mar. 20, 1990

[54] PROCESS FOR THE PRODUCTION OF GROUND MEAT ANALOG

[76] Inventors: Jeffree Lee; Laura Lee, both of 755 14th Ave., Suite 316, Santa Cruz, Calif. 95062

[21] Appl. No.: 327,544

[22] Filed: Mar. 23, 1989

[51] Int. Cl.$^4$ ................................................ A23L 1/36
[52] U.S. Cl. ..................................... 426/28; 426/460; 426/549; 426/802
[58] Field of Search ............... 426/802, 419, 549, 634, 426/459, 460, 461, 18, 28

[56] References Cited

U.S. PATENT DOCUMENTS

| | | | |
|---|---|---|---|
| 1,355,129 | 10/1920 | Corby | 426/28 |
| 1,554,913 | 9/1925 | Grelck | 426/28 |
| 1,885,411 | 11/1932 | Brown | 426/28 |
| 2,137,141 | 9/1936 | Lindsey | 426/28 |
| 2,627,464 | 2/1953 | Kehetian | 426/28 |
| 3,014,802 | 12/1961 | Hellman | 426/28 |
| 3,240,606 | 3/1966 | Bond | 426/28 |
| 3,645,747 | 2/1972 | Palmer | 426/802 |
| 3,647,473 | 3/1972 | Stowell | 426/18 |
| 3,669,678 | 6/1972 | Kraft | 426/549 |
| 3,840,677 | 10/1974 | Leidy | 426/802 |
| 3,897,569 | 7/1975 | Horgan | 426/28 |
| 4,052,795 | 10/1977 | Pollock | 426/28 |
| 4,124,727 | 11/1978 | Rockland | 426/549 |
| 4,705,693 | 11/1987 | Mitra | 426/634 |
| 4,859,486 | 8/1989 | Douglass | 426/460 |

FOREIGN PATENT DOCUMENTS 53-41215  11/1978  Japan ................................. 426/802

*Primary Examiner*—Carolyn Paden
*Attorney, Agent, or Firm*—Jeffrey A. Hall

[57] ABSTRACT

A simulated ground meat analog derived from sprouted whole grain kernels and the process for making it is disclosed. The sprouted grain kernels are soaked in water and sprouted until the cotyledons are approximately one half inch in length. The sprouted kernels are then ground and kneaded to a meat-like texture. Suitable meat-like flavors and nutritional supplements may then be added to produce a ground meat analog which closely resembles ground meat in taste, texture, and appearance.

18 Claims, No Drawings

PROCESS FOR THE PRODUCTION OF GROUND MEAT ANALOG

BACKGROUND OF THE INVENTION

1. Field of the Invention

This invention relates generally to food products and more particularly to a ground meat analog derived from sprouted whole grains, and to a process for producing said ground meat analog.

2. Description of the Prior Art

Many, if not most consumers of ground meat products would prefer a ground meat, for example hamburger, with no cholesterol, few calories, and which is free from chemical additives, artificial preservatives, hormones, and antibiotics normally found in such meat products. Furthermore, with the world population rapidly rising, it is becoming increasingly difficult to produce high quality animal protein in sufficient quantities and at affordable prices to meet demand.

Heretofore, numerous food products have been produced from tissual or fibrous vegetable proteins to address these problems and have been sold as meat extenders or meat analogs, which, to varying degrees resemble the taste and appearance of various ground meats, as well as beef, pork, fowl, chicken, and fish. However, the development of a satisfactory ground meat analog resembling ground meat, in particular groundround or hamburger, has remained elusive. The primary reason for this is due to the difficulty in producing a ground meat analog that is flavorful, nutritious, and similar to ground meat in appearance, texture, and taste.

One approach has been the development of meat extenders from various vegetables which are added to the natural meat to increase the quantity of the meat without substantially modifying the appearance, taste, texture, or nutritional value of the meat. The principal plant tissue employed for prior art research has been derived from soybeans. Soybeans have been modified by various processes to spin and extrude the soy protein into meat-like products. These soybean based extenders have proved unsatisfactory because of their strong "bean" flavor, amino acid imbalance, and undesirable flatus component.

Another type of meat extender has been derived from moisture-cooking wheat kernels and adding the dried product into various natural meats. Unfortunately, these types of meat analogs are limited in their application as a meat substitute by their taste, texture, appearance, and by the limited amount that can be added to the natural meat without seriously compromising the taste and texture of the final product.

A suitable ground meat analog should be derived from a relatively inexpensive source by means of an easily practiced process. The ground meat analog should be modified to resemble the appearance, taste, texture, and nutritional value of ground meat, in particular, groundround or hamburger which is used in a wide variety of foods and to which this invention is directed. The ground meat analog should be capable of being mixed with ground meats as a meat extender and also be sufficiently palatable for human consumption alone without mixing it with any meat protein sources.

The present invention provides a novel process utilizing whole grains which are traditionally processed in one of three ways; refining, moisture-cooking, or grinding into a flour. The sprouted grain ground meat analog of this invention is not produced by any of these methods. The resulting product is quite different in taste, texture, and appearance from meat extenders or meat analogs produced by the aforementioned processes.

SUMMARY OF THE INVENTION

It is an object of this invention to provide a meat analog and process of making the same which utilizes sprouted grain kernels as the basic raw material.

It is a further object of the invention to provide for modifying the characteristic of the sprouted grain kernels to produce a ground meat analog which resembles groundround or hamburger meat in appearance, taste, texture, and nutritional value.

It is a still further object of this invention to provide a process for producing a sprouted grain based meat analog which provides a source of complex carbohydrate, natural vegetable fiber, and all the essential amino acids to form a complete substitute protein source with no accompanying cholesterol.

It is another object of this invention to provide a sprouted-grain based meat analog and process for producing the same which is both economical and easily practiced.

It is an additional object of this invention to provide a process for making a sprouted grain based ground meat analog which is suitable for use in a wide variety of dishes.

It is another object of this invention to provide a process for making a sprouted grain based ground meat analog which is easily packaged and stored for extended periods of time.

Briefly, the process of the invention comprises the steps of rinsing and soaking raw whole grain kernels for 8-12 hours; draining the excess water and covering the soaked grains while allowing air to circulate over and around the kernels; rinsing the kernels daily with water to promote sprouting; maintaining high moisture and humidity surrounding the kernels until the sprouts (cotyledons) are approximately one half of an inch long; grinding the sprouted kernels into a meal; kneading the mixture to develop the gluten structure; and then combining the mixture with condiments and spices to develop a meat-like texture and flavor. The resulting product may then be shaped into ground meat food products such as hamburger patties, meatballs, meatloaf, or the like.

The nature of the invention and other objects and advantages thereof will be more readily understood by those skilled in the art after consideration of the following detailed description.

DESCRIPTION OF THE PREFERRED EMBODIMENT OF THE INVENTION

Generally, the process for producing the ground meat analog according to the preferred embodiment of the invention comprises the following steps: (1) wheat kernels are cleaned and rinsed in water and then soaked for approximately 8-12 hours water; (2) excess water is then drained from the soaked wheat kernels; (3) the soaked grain kernels are covered allowing air to circulate while maintaining ambient temperature at approximately 25 degrees centigrade; (4) the wheat kernels are rinsed approximately twice every twenty four hours with water to promote sprouting, continuing this until the sprouts (cotyledons) are approximately one half of an inch long; (5) the sprouted wheat kernels are ground; (6) the meal is kneaded to develop gluten structure, and;

(7) the mixture is then combined with meat flavor and texture enhancers.

The above process has been described wherein wheat kernels are used as a starting material. Different wheat varieties and types may be utilized such as red winter wheat or spring wheat kernels varieties, for example. The use of other whole grain kernels may also be substituted for wheat and combined to produce satisfactory results. For example, whole rye kernels may be substituted for the wheat kernels and treated in a similar process to achieve a high quality ground meat analog. It has also been found that quite satisfactory results may be obtained by combining sprouted wheat kernels and sprouted rye kernels according to the invention in ratios from approximately 2:1 to 1:1.

The process and product of the invention is distinguished from known ground meat analogs by the steps of the preparation of sprouted whole grain kernels, sprouting (cotyledon production) the kernels, grinding the kernels and sprouts into a meal, kneading the meal so produced, and adding flavor and texture enhancers thereto to achieve a ground meat like analog. By combining these steps as described, it is possible to obtain a ground meat analog exhibiting a hardness, chewiness, and similar flavor to those of ground meat.

The method of the invention will be described in more detail hereinafter.

In the preferred embodiment, whole hard kernels of wheat are cleaned and rinsed with water. The whole kernels have about 12–15% protein content. The washed kernels are then immersed in water for between approximately 8–12 hours to stimulate the sprouting (cotyledon development) of the kernels. The excess water is then drained from the kernels and the kernels are then covered to maintain a high moisture and humidity level, preferably above 80% relative humidity, surrounding the grains. It is preferable to allow air to circulate over the surface of the grains to promote rapid sprouting. To accomplish this either a breathable material such as cloth may be used as a cover or alternatively a plastic like material may be substituted. It is preferable to replace the cover so as to allow air to circulate over the surface of the kernels. The ambient air temperature is maintained at between 22 to 26 degrees centigrade, preferably at approximately 25 degrees centigrade. At this temperature the rate of sprouting is enhanced and a high quality of sprouted grain kernel is developed. During the growth and development of the sprouted kernels it is preferable to keep the kernels out of direct light. The kernels should be rinsed twice every twenty four hours to stimulate and enhance sprouting. The rinsing of the kernels stimulates healthy growth and development of the sprouts and facilitates the maintenance of high moisture and humidity levels surrounding the kernels. When the sprouts are approximately one half inch long the kernels and sprouts are harvested.

The next two steps are grinding and kneading. The grinding step which precedes the kneading step causes a fragmentation of the sprouted kernels. The grinding step causes the sprouted kernels to have a more meat-like texture. In the preferred embodiment one half of the sprouted kernels are ground once while the other half are subjected to double grinding. The kneading step develops the gluten structure of the meal. In the preferred embodiment approximately 1-9% cooked brown rice for texture, and 0.03–0.05% beet extract or 0.0017% food coloring coloring is added following the grinding step. The longer the kneading takes place, the more developed the gluten structure becomes. However, if excess kneading is used it is possible to destroy the structure of the gluten. It may be noted that both grinding and kneading may take place in a single, mechanical operation. If a screwfeed type grain or meat grinder is employed, the grinder is preferably set for "fine-grind" mode of operation. At this stage of the process, the ground meat analog is palatable and fit for human consumption either by itself or when mixed with a natural meat. In order to increase its palatability, however, the mixture is mixed with condiments and spices to achieve a more meat-like taste and texture. Spices and other flavoring may be added following the grinding or kneading step.

The foregoing describes the process for making a ground meat analog in accordance with the invention. The wheat kernels employed as the basic raw material for the process may be of any variety but preferably are red winter wheat. By changing the variety or type of grain kernels used as the starting material, it is possible to produce a ground meat analog which is similar to meats such as poultry, pork, and fish, for example, which have a lighter color and different mixture than that of a groundround beef product.

The ground meat analog produced by the basic process is ready for immediate use, however, it is often desirable to provide a preservative for long term storage and packaging. To this end a salt content of between 1 to 3% may be added to the finished product to prevent putrefaction and to inhibit the growth of pathogenic organisms. The addition of salt to the finished product also increases the amount of soluble solids to permit the ground meat analog to remain pliable or chewy over a long period of time. Alternatively, a 0.1% sorbic acid or other suitable anti-mycotic agent may be added to the ground meat analog during preparation to control yeasts, molds and some bacteria. This permits the packaging and sealing of the ground meat analog at normal room temperatures. Another method of extending the longevity of the ground meat product is to lower the moisture content of the finished product to about 11-13%. Other methods of preservation are well known in the art and may be applied without deviating from the scope of the invention.

The ground meat analog produced by this process is a highly nutritious and palatable food. If it is desired to alter the protein, vitamin, or mineral content of the product the addition of the desired amino acid, vitamin, or mineral supplements may be added to the ground meat analog. These supplements and the technology of adding them to the ground meat analog are well known and will not be describe in detail herein. It has been found, however, that the addition of vitamin and mineral supplements to the ground meat analog should take place at a late stage in the manufacturing process. The addition of protein, vitamin and mineral supplements should, of course, be accomplished without modifying the product. The supplemental protein may also be added prior to the grinding step in the basic process or it may be pre-cooked and added to the matrix after kneading or in a later stage in the process. The decision as to when to add the supplemental material is largely related to convenience and economy in manufacture.

The sprouted grain ground meat analog produced by the method of invention may be used alone or added to any of the various types of natural meats. The sprouted grain ground meat analog is particularly valuable because it is a highly palatable, nutritionally balanced food for both humans and animals without the accompanying cholesterol and high saturated fat content found in natural meat products. This is particularly valuable for those human diets where the amount of animal fat intake must be restricted for medical reasons. Since the basic product employs sprouted wheat kernels complex carbohydrates and natural vegetable fiber are also provided in a simple, uncomplicated, and inexpensive manufacture. The sprouted grain ground meat analog is also easily preserved and stored over relatively long periods of time in comparison with natural meats. Furthermore, the substitution of a grain based meat analog for natural meats provides a solution to a longstanding environmental imbalance, namely the inefficient conversion of cereal grains to natural meat by domestic animal production.

EXAMPLES

Examples of the process of the invention are shown below. These examples, however, are only illustrative and not intended to restrict the scope of the invention.

EXAMPLE 1

Wheat kernels were soaked and sprouted according to the invention. 1 kg. of sprouted kernels were divided into two equal parts. One half was ground once through a standard meat grinder set at fine. The other half was ground twice through the same grinder. Both halves were then combined and 30 grams of cooked brown rice was added to the mixture. Then beet extract was added for coloring. The mixture was then kneaded to a dough-like consistency and 2 grams of spice mixture composed of sesame seeds, sea salt, garlic powder, cumin, fennel seeds, and baking powder was mixed therethrough. The ground meat analog was then shaped into hamburger-shaped patties and grilled for 10-15 minutes on each side to brown and then baked at 350 degrees F. for twenty to thirty minutes.

EXAMPLE 2

Wheat kernels and rye kernels were sprouted according to the invention. To 2 kg. sprouted wheat kernels 1 kg. of sprouted rye kernels were added. The mixture of wheat and rye kernels was then divided in half. One half was ground once through a standard meat grinder set at fine. The other half was ground twice through the same grinder. The two halves were then mixed together and 120 grams of cooked brown rice was then added thereto. Beet extract was added for coloring. The resultant mixture was then kneaded to a dough-like consistency and 6 grams of spice mixture consisting of sesame seeds, sea salt, garlic powder, cumin, fennel seeds, and baking powder was mixed therethrough. The ground meat analog was then shaped into hamburger patties and grilled for approximately 10-15 minutes on each side to brown and then baked at 350 degrees F. for twenty to thirty minutes.

While the above description contains many specificities, the reader should not construe these as limitations on the scope of the invention, but merely as exemplifications of preferred embodiments thereof. Those skilled in the art will envision many other possible variations are within its scope. For example, skilled artisans will readily be able to change the types and varieties of grains used in the process. They will be able to add a variety of different nutritional supplements, such as amino acids and vitamins. They can add preservatives or leave them out of the ground meat analog. In fact it is believed apparent that many changes could be made in the composition of the ground meat analog and in the process of making the same and many seemingly different embodiments of the invention could be made without departing from the scope thereof. Accordingly, the reader is requested to determine the scope of the invention by the appended claims and their legal equivalents, and not by the examples which have been given.

What is claimed is:

1. A process for making a simulated ground meat analog from sprouted grain kernels, having a texture and flavor similar to ground meat, said method comprising soaking the grain kernels to promote sprouting;
   maintaining moisture and humidity level surrounding the grain kernels until the grain sprouts are approximately one half inch long;
   grinding the sprouted grain kernels to a meat like consistency, and
   kneading the ground material until the gluten structure thereof is developed but not destroyed, thereby obtaining a ground meat analog exhibiting a hardness, chewiness, and flavor similar to that of ground meat.

2. The process according to claim 1 further comprising mixing the ground, kneaded material with a meat coloring substance corresponding to the color of a natural meat.

3. The process according to claim 2 further comprising adding from 1%-9% cooked brown rice to the ground meat analog to modify the texture and nutritional value of the ground meat analog.

4. The process according to claim 2 further comprising adding protein supplements to increase the protein level of the ground meat analog.

5. The process according to claim 2 further comprising adding vitamin and mineral supplements to modify the nutritional value of the ground meat analog.

6. The process according to claim 2 further comprising adding an anti-mycotic agent to the ground meat analog to facilitate storage and to permit packaging at room temperatures.

7. The process according to claim 2 wherein said grinding and kneading steps are carried out simultaneously.

8. The process according to claim 2 further comprising sealing the ground meat analog in a container for storage.

9. The process according to claim 1 further comprising mixing the ground, kneaded material with a meat flavor substance corresponding to the flavor of a natural meat.

10. The process according to claim 1 wherein said grain kernels are wheat kernels.

11. The process according to claim 1 wherein said kernels are rye kernels.

12. The process according to claim 1 wherein said sprouted grain kernels are a mixture of sprouted wheat kernels and sprouted rye kernels.

13. A process of making a ground meat analog having a hardness, chewiness, and flavor similar to that of ground meat comprising sprouting wheat kernels for about three days in a controlled environment of high moisture and humidity until the sprouts are about one half inch long;
   grinding the sprouted wheat kernels to a meat-like consistency;
   kneading the ground material until the gluten structure thereof is developed but not destroyed; and mixing the ground, kneaded material with a meat flavor substance corresponding to the flavor of a natural meat, thereby obtaining a ground meat analog with a texture and flavor similar to natural meats.

14. The process according to claim 13 further comprising mixing the ground kneaded mixture with a meat color substance corresponding to the color of a natural meat.

15. The process according to claim 13 further comprising adding from approximately 1%-9% cooked brown rice to the ground meat analog to modify the texture and nutritional value of the ground meat analog.

16. The process according to claim 13 further comprising adding vitamin and mineral supplements to modify the nutritional value of the ground meat analog.

17. The process according to claim 13 further comprising adding an anti-mycotic agent to the ground meat analog to facilitate storage and to permit packaging at room temperatures.

18. The process according to claim 1 wherein said grinding and kneading steps are carried out simultaneously.

* * * * *